US010521883B1

United States Patent
Hayes et al.

(10) Patent No.: US 10,521,883 B1
(45) Date of Patent: Dec. 31, 2019

(54) IMAGE TURBULENCE CORRECTION USING TILE APPROACH

(71) Applicant: RAYTHEON COMPANY, Waltham, MA (US)

(72) Inventors: Matthew John Francis Hayes, Prosper, TX (US); Christopher J. Beardsley, Plano, TX (US); David U. Fluckiger, Allen, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/046,833

(22) Filed: Jul. 26, 2018

(51) Int. Cl.
*H04N 5/217* (2011.01)
*G06T 3/40* (2006.01)
*G06T 5/10* (2006.01)
*H04N 5/232* (2006.01)

(52) U.S. Cl.
CPC .............. *G06T 3/4015* (2013.01); *G06T 5/10* (2013.01); *H04N 5/23229* (2013.01)

(58) Field of Classification Search
CPC .................................................. G06T 5/4015
See application file for complete search history.

(56) References Cited

U.S. PATENT DOCUMENTS

| 7,245,742 B2 * | 7/2007 | Carrano | G06T 5/003 250/201.9 |
| 8,294,748 B2 | 10/2012 | Stec et al. | |
| 8,553,108 B2 * | 10/2013 | Holmlund | G06T 5/003 348/144 |
| 9,773,313 B1 | 9/2017 | Klingner et al. | |
| 2004/0005098 A1 * | 1/2004 | Carrano | G06T 5/003 382/254 |

(Continued)

FOREIGN PATENT DOCUMENTS

| WO | WO 2007/122584 A1 | 11/2007 |
| WO | WO 2009/055913 A1 | 5/2009 |
| WO | WO 2016/175751 A1 | 11/2016 |

OTHER PUBLICATIONS

Xiao, et al., "Adaptive Region-Based Video Registration," Application of Computer Vision, 2005. WACV/Motions '05, vol. 1.

(Continued)

*Primary Examiner* — Gary C Vieaux
(74) *Attorney, Agent, or Firm* — Lewis Roca Rothgerber Christie LLP

(57) ABSTRACT

System and method for image turbulence correction includes: receiving a plurality of consecutive image frames; demosaicing previous, current and preceding image frames into a plurality of same size overlapping video tiles; determining a displacement of each of the video tiles; converting the video tiles of the current image frame, the previous image frame, and the plurality of preceding image frames into a frequency domain; iteratively processing the video tiles of the previous image frame, the current image frame and the plurality of preceding image frames for turbulence correction in the frequency domain; converting the turbulence corrected video tiles into a spatial domain, wherein the converted turbulence corrected video tiles form a single video frame tile including turbulence degradation correction; and mosaicing the single video frame tiles including turbulence degradation correction together to generate a full field of view turbulence correct video stream.

19 Claims, 7 Drawing Sheets

(56) References Cited

U.S. PATENT DOCUMENTS

2014/0064554 A1 3/2014 Coulter et al.
2018/0324359 A1* 11/2018 Pan .................... H04N 5/23267

OTHER PUBLICATIONS

Aubailly, et al., "Automated Video Enhancement From a Stream of Atmospherically-Distorted Images: The Lucky-Region Fusion Approach", Proceedings of SPIE 7513, 2009, vol. 7463, Aug. 12, 2009 (12 pgs.).
Bertozzi, et al. Video Stabilization of Atmospheric Turbulence Distortion, Inverse Problems and Imaging, vol. 7, No. 3, Sep. 1, 2013 (pp. 839-861).
International Search Report for corresponding International Application No. PCT/US2019/028998, filed Apr. 24, 2019, International Search Report dated Jul. 22, 2019 and dated Aug. 2, 2019 (5 pgs.).
Written Opinion of the International Searching Authority for corresponding International Application No. PCT/US2019/028998, filed Apr. 24, 2019, Written Opinion of the International Searching Authority dated Aug. 2, 2019 (6 pgs.).

\* cited by examiner

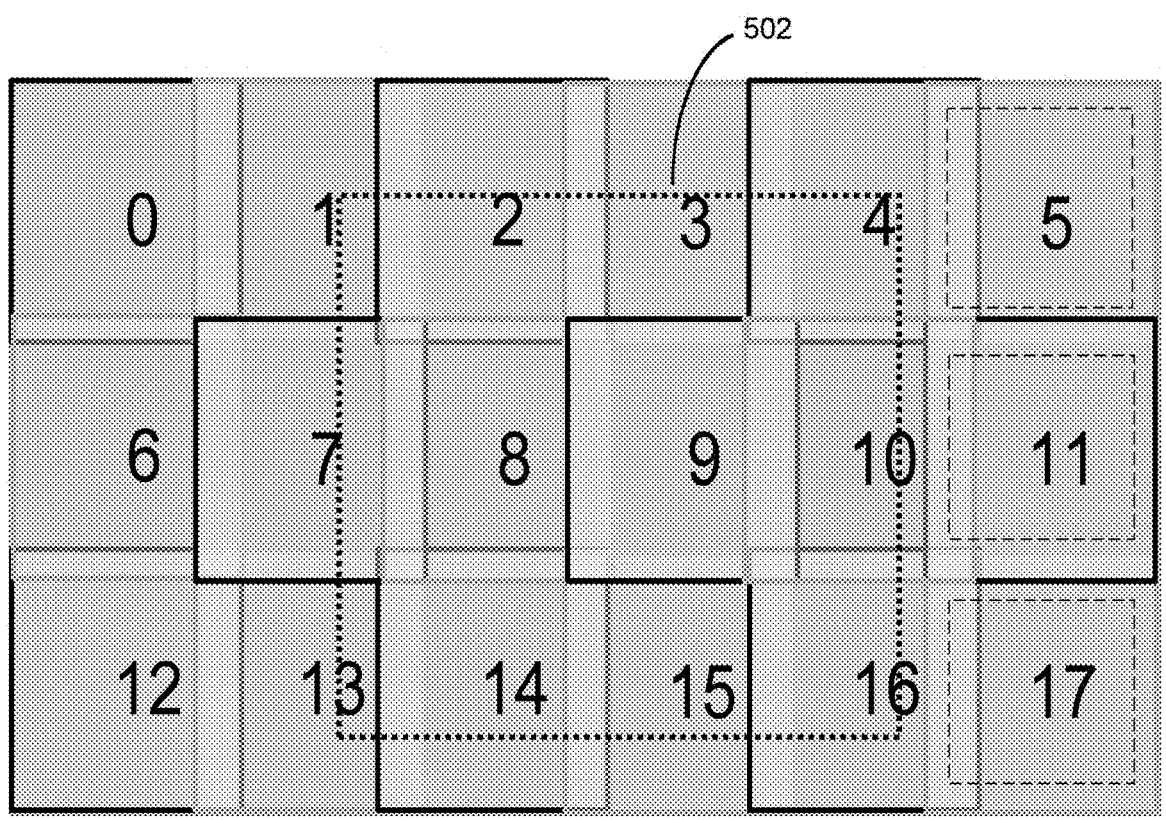

IMAGE TURBULENCE CORRECTION USING TILE APPROACH

GOVERNMENT LICENSE RIGHTS

This invention was made with Government support. The Government has certain rights in the invention.

FIELD OF THE INVENTION

The present invention relates generally to image processing and more specifically to image turbulence correction in video processing using tile approach.

BACKGROUND

When video is taken through turbulent air, as may be the case when an aircraft-mounted video camera obtains video of the ground, image degradation (e.g., blurring) may be produced by atmospheric turbulence in the air through which light travels on its way from the scene to the video camera. This blurring may degrade the quality of the video and diminish its value to an operator observing the video, or to processing equipment using the video for automated analysis or control.

For Electro-Optical (EO) and Infrared (IR) imaging, performance of the conventional imaging systems is often limited by atmospheric seeing conditions. In these systems, imagery from an optical system experiences different spatial motion (e.g., rotation at edges, moving targets, etc.) throughout the scene, but some temporal filters may be able to perform optimally on features being co-spatially located. Nevertheless, non-congruent digital manipulation of individual subset images create "blocky" larger mosaic video and applying a non-linear filter causes a non-unity gain that needs to be corrected in each tile of the mosaic. Low frequency conditions are also challenging to correct and require different spatial compensation and stitching to avoid image artifacts.

Additionally, real-world scenes with high-definition and high-dynamic-range sensors need robust processes. Moreover, handling an image with subsets images can cause non-uniformities between the tiles and thus extra care is required to match gain and level between the subsets images. Also, image optimization processes that use global frame registration require precise results, across the full Field of View (FOV).

Thus, there is a need for a system and method for mitigating the effects of turbulence, for example, atmospheric turbulence on video data, especially across a full Field of View.

SUMMARY

In some embodiments, the disclosed invention is a system for image turbulence correction. The system includes a video camera for generating a plurality of consecutive image frames comprising a previous image frame, a current image frame and a plurality of preceding image frames; an image processor; and a video display. The image processor includes computer code stored in a memory to perform the following processes when executed by the image processor: receives the plurality of consecutive image frames; demosaices the current image frame into a plurality of same size overlapping video tiles; determines a displacement of each of the video tiles of the current frame relative to respective video tiles of the previous frame to spatially align the video tiles of the current frame with video tile of the previous frame; converts the video tiles into a frequency domain; iteratively processes the video tiles of the previous image frame, the current image frame and the plurality of preceding image frames for turbulence correction in the frequency domain; converts turbulence corrected video tiles into a spatial domain, wherein the converted turbulence corrected video tiles is a single video frame tile including turbulence degradation correction; mosaics the single video frame tiles including turbulence degradation correction together to generate a full field of view (FOV) turbulence correct video stream; and displays the FOV turbulence correct video stream on the video display.

In some embodiments, the disclosed invention is a system for image turbulence correction. The system includes: means for receives the plurality of consecutive image frames comprising a previous image frame, a current image frame and a plurality of preceding image frames; means for demosaicing the current image frame into a plurality of same size overlapping video tiles; means for determining a displacement of each of the video tiles of the current frame relative to respective video tiles of the previous frame to spatially align the video tiles of the current frame with video tile of the previous frame; means for converting the video tiles into a frequency domain; means for iteratively processing the video tiles of the previous image frame, the current image frame and the plurality of preceding image frames for turbulence correction in the frequency domain; means for converting turbulence corrected video tiles into a spatial domain, wherein the converted turbulence corrected video tiles is a single video frame tile including turbulence degradation correction; means for mosaicing the single video frame tiles including turbulence degradation correction together to generate a full field of view (FOV) turbulence correct video stream; and means for displaying the FOV turbulence correct video stream on the video display.

In some embodiments, the disclosed invention is a method for image turbulence correction. The method includes receiving a plurality of consecutive image frames comprising a previous image frame, a current image frame and a plurality of preceding image frames, from a video camera; demosaicing the previous image frame, current image frame and the plurality of preceding image frames into a plurality of same size overlapping video tiles; determining a displacement of each of the video tiles of the current frame relative to respective video tiles of the previous frame and the plurality of preceding image frames to spatially align the video tiles of the current image frame with video tile of the previous image frame and the plurality of preceding image frames; converting the video tiles of the current image frame, the previous image frame, and the plurality of preceding image frames into a frequency domain; iteratively processing the video tiles of the previous image frame, the current image frame and the plurality of preceding image frames for turbulence correction in the frequency domain; converting the turbulence corrected video tiles into a spatial domain, wherein the converted turbulence corrected video tiles form a single video frame tile including turbulence degradation correction; and mosaicing the single video frame tiles including turbulence degradation correction together to generate an FOV turbulence correct video stream.

BRIEF DESCRIPTION OF THE DRAWINGS

These and other features, aspects, and advantages of the present invention will become better understood with regard to the following description, appended claims, and accompanying drawings.

FIGS. 5A and 5B illustrate exemplary frame registration grids, according to some embodiments of the disclosed invention.

DETAILED DESCRIPTION

In some embodiments, the disclosed invention is a system and method for processing video for determining and applying turbulence corrections that include full Field of View (FOV), video manipulation, frame-to-frame registration and stitching. In some embodiments, the frame-to-frame registration process accurately measures motion across the FOV to within ⅛ pixel to support image enhancement processes such as Turbulence Correction (TC) and Electronic Scene Stabilization (ESS) and independently moving mosaic tiles stitched to form larger imagery without high frequency artifacts. This way, the invention removes turbulence degradation across the entire FOV to improve image resolution and contrast. The present invention improves various technologies, such as commercial imaging, consumer imaging and medical imaging technologies.

In some embodiments, the disclosed invention uses an adaptable process based on scene content, which can be used with any sensor's spectral response, for example, short wave infrared, visible, or mid-wave infrared signals. In some embodiments, the disclosed invention applies vertical and horizontal weighted average between subset images, with fixed overlap of subset images to allow for blending between the subset images. The disclosed invention then automatically corrects motion measurements when objects move through the image and automatically substitutes motion measurements for low contrast portions of the scene.

Figure 1:
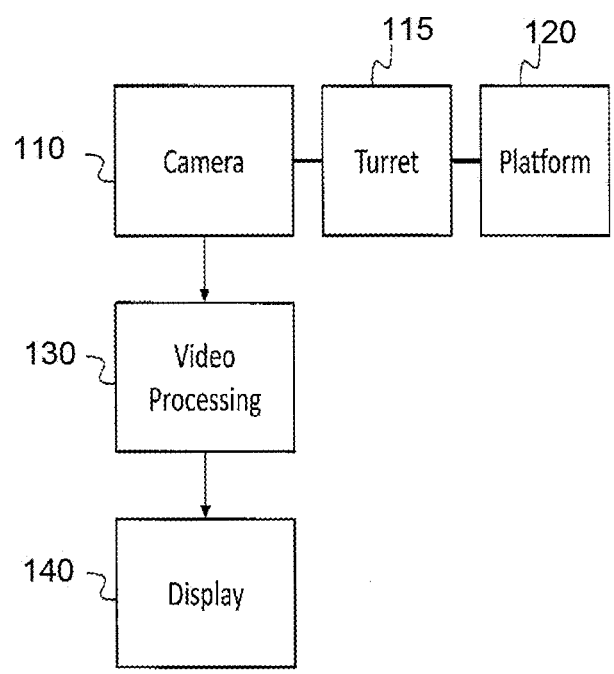
FIG. 1 is a simplified block diagram of a video system, according to some embodiments of the disclosed invention.

FIG. 1 shows a block diagram of a video system according to some embodiments of the disclosed invention. As shown, a video camera 110 is secured to a turret 115, which is secured to a platform 120, such as an aircraft, vessel, vehicle, or human. The turret 115 steers the video camera 110 and the video from the video camera 110 is processed by a video processor 130 that generates processed video. The processed video is then displayed on a display 140, or transmitted to a control system which may, for example, control the turret 115 to track features of interest in the video images.

The video processor 130 may be implemented in one or more processing devices. The video processor 130 may include any combination of hardware, firmware, and software employed to process data or digital signals. Processing hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs).

In some embodiments, the video processor 130 includes a turbulence correction (TC) processor, i.e., a processor including hardware, software and/or firmware for mitigating the image degradation (e.g., blurring) that may be produced by atmospheric turbulence in the air through which light travels on its way from the scene to the video camera 110. In some embodiments, the video camera is configured to generate a plurality of consecutive luminance frames, including a last frame and a plurality of preceding frames. The video processor 130 is configured to shift the plurality of preceding frames and to register the preceding frames with the last frame to form a plurality of shifted frames to form an enhanced luminance frame. The video display is configured to display the enhanced luminance frame. In some embodiments, the disclosed invention produces a temporally filtered image that is reconstructed into a mosaic, for example, by the video processor 130.

As used herein, a module is a system element that receives digital numerical input and generates digital numerical output. The numerical input and output may be stored in a memory in the module. The module may be implemented in software, firmware, hardware (circuit), or in any combination thereof. In some embodiment, each module is a piece of software and/or firmware (e.g., a function, a subroutine, or an object) running on a processor, for example, an image processor executing instructions.

Figure 2:
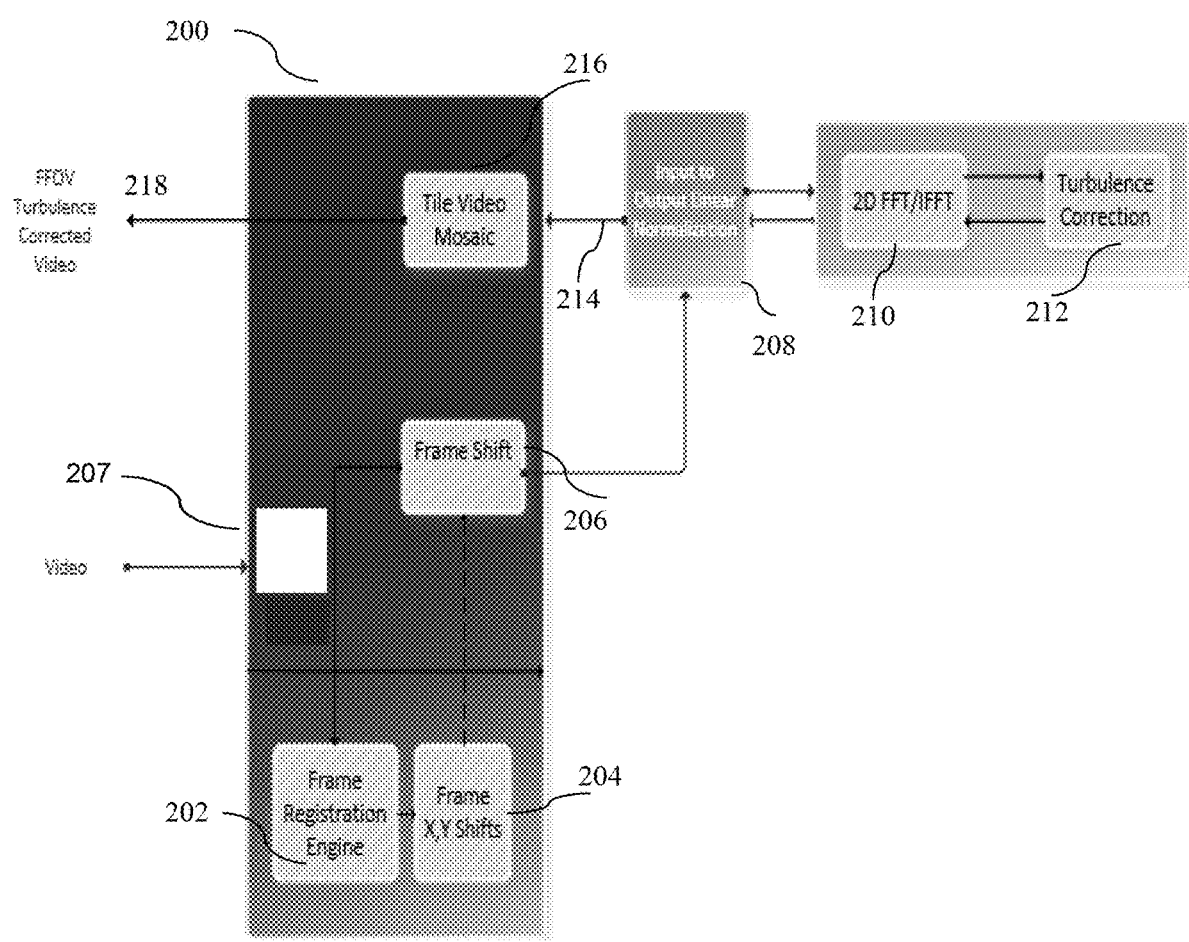
FIG. 2 is an exemplary block diagram of a full FOV imaging system with turbulence correction, according to some embodiments of the disclosed invention.

FIG. 2 is an exemplary block diagram of a full FOV imaging system 200 with turbulence correction, according to some embodiments of the disclosed invention. As depicted, an input video stream (e.g., from video camera 110 of FIG. 1) is received by an input port of the system and then demosaiced into a plurality (e.g., 18) of same-size overlapping tiles, organized in rows and columns by a demosaicing circuit 207. A temporal stack of each video tile is then stored in a memory for later use. A frame registration engine 202 is used for each tile in the first row of the demosaiced tiles (e.g., 6 tiles in a row of 18 demosaiced tiles). The frame registration engines 202 (e.g., one engine for each row of demosaiced tiles) are then reused for subsequent rows of tiles. This way, a separate frame registration engine 202 is used for each tile in each row of the demosaiced tiles. For simplicity reasons, only one box (202) is depicted in FIG. 2 for frame registration engines.

Frame registration calculation is performed on each tile to determine a displacement (e.g., dX and dY, i.e., the linear displacement in a two-dimensional coordinate system) relative to the previous frame tile, by a frame shifter 204. The results are then provided to a sub-pixel frame shifter 206. A temporal stack of video tile (e.g., 6 tile frames in this example) from the stored temporal stack of video tiles is spatially aligned by the frame shifter 204. It is noted that the turbulence correction process better reduces the atmospheric disturbances on images, if they are spatially aligned. The current tile frame is then measured for image statistics that are stored as an array in a memory for later use. The current tile frame's image statistics is utilized to ensure that overall dynamic range of output image matches as closely as possible to input tile histogram 602, described below with respect to FIG. 6.

The spatially aligned stack of tiled video images is then converted to the frequency domain, for example, by inputting them to a two-dimensional Fast Fourier Transform (2D FFT) and/or 2D Inverse FFT (IFFT) (2D FFT/IFFT) circuit 210, as known in the art, to convert the video images to the frequency domain. Although the FFT and IFFT circuits are depicted in one block 210, one skilled in the art would recognize that they may constitute two different circuits. A turbulence correction iterative loop is applied to the stack of images, by a turbulence correction processor 212. The output is fed back through the 2D FFT/IFFT circuit 210 to perform an IFFT to return the output of turbulence correction processor 212 to the spatial domain. This spatial domain output of the 2D FFT/IFFT circuit 210 is a single frame tile that has had turbulence degradation corrected by the turbulence correction processor 212. This output is then stored in the memory and used twice. The first use calculates the image statistics to determine the range of pixels from minimum to maximum in addition to the median/mean from a histogram that is formed from the image statistics. The pixel value range of the image is compared to the current tile frame pixel value range, taken prior to turbulence correction process to determine a linear relationship between the two values.

The linear relationship between these two values is used as the gain term in normalizing the image. For example, in some embodiments, the most recent image tile in the stack is used to generate the input statistics. After the stack of image tiles is processed with turbulence correction, a single image tile is created. the corrected image tile statistics is then compared to the input statistics and normalized to the input image tile. Also, the difference between current tile frame median and post processing tile median is used as a level shift of the post processed tile.

The stored spatial domain output of the 2D FFT/IFFT circuit 210 is also used to apply the gain and level shift to the post processing tile image and therefore closely match the current tile frame statistics. In some embodiments, the marching process determines the difference between current image tile and post turbulence correction tile (e.g., by level shifting) and determines the relationship between the current image tile pixel value range and post turbulence correction tile pixel value range (e.g., the gain). The post turbulence correction tile pixel values are then shifted using the level shift value. This centers the post turbulence correction pixel values range equally to the current image tile. The post turbulence correction pixel values are then multiplied by the calculated gain resulting in an output image tile. This output image tile shares the median value and pixel value range of the current image tile.

A normalization circuit 208 then applies normalization to tiles before they are stitched together, using the linear relationship between the pixel value range of the image and the current tile frame pixel value range. Subsequently, all tiles are transferred serially (214) and mosaiced back together, by a mosaic processor 216. The mosaicing process performed by the mosaic processor 216 includes cropping of the individual tiles and a weighted average being applied across the three overlapping regions, that is, horizontal, vertical, and both, of the tiles. In some embodiments, this weighted averaging is based on the start of the overlapping regions. The output 218 is a full FOV turbulence correct video stream.

In some embodiments, the functions of one or more of the frame registration engine(s) 202, frame shifter 204, demosaicing circuit 207, normalization circuit 208, 2D FFT/IFFT circuit 210, turbulence correction processor 212, and the mosaic processor 216 may be performed by a single processor, for example a video processor or image processor similar to the video processor 130 in FIG. 1 executing firmware and/or software.

In some embodiments, the circuits depicted in FIG. 2 perform a less complex process for image turbulence correction. For example, a plurality of consecutive image frames comprising a previous image frame, a current image frame and a plurality of preceding image frames are received; the current image frame is then demosaiced into a plurality of same size overlapping video tiles (e.g., by the demosaicing circuit 207 of FIG. 2 or the video processor 130 of FIG. 1); a displacement of each of the video tiles of the current frame relative to respective video tiles of the previous frame is determined to spatially align the video tiles of the current frame with video tile of the previous frame (e.g., by the frame shifter 204 of FIG. 2); the video tiles are then converted into a frequency domain (e.g., by the 2D FFT/IFFT circuit 210 of FIG. 2); and the video tiles of the previous image frame, the current image frame and the plurality of preceding image frames are iteratively processed for turbulence correction in the frequency domain (e.g., by the turbulence correction processor 212 of FIG. 2). The turbulence corrected video tiles is converted back into a spatial domain e.g., by the 2D FFT/IFFT circuit 210 of FIG. 2), where the converted turbulence corrected video tiles is a single video frame tile including turbulence degradation correction; and the single video frame tiles of the previous image frame, the current image frame and the plurality of preceding image frames are mosaiced together to generate a full field of view (FOV) turbulence correct video stream (e.g., by the mosaic processor 216 of FIG. 2).

Figure 3:
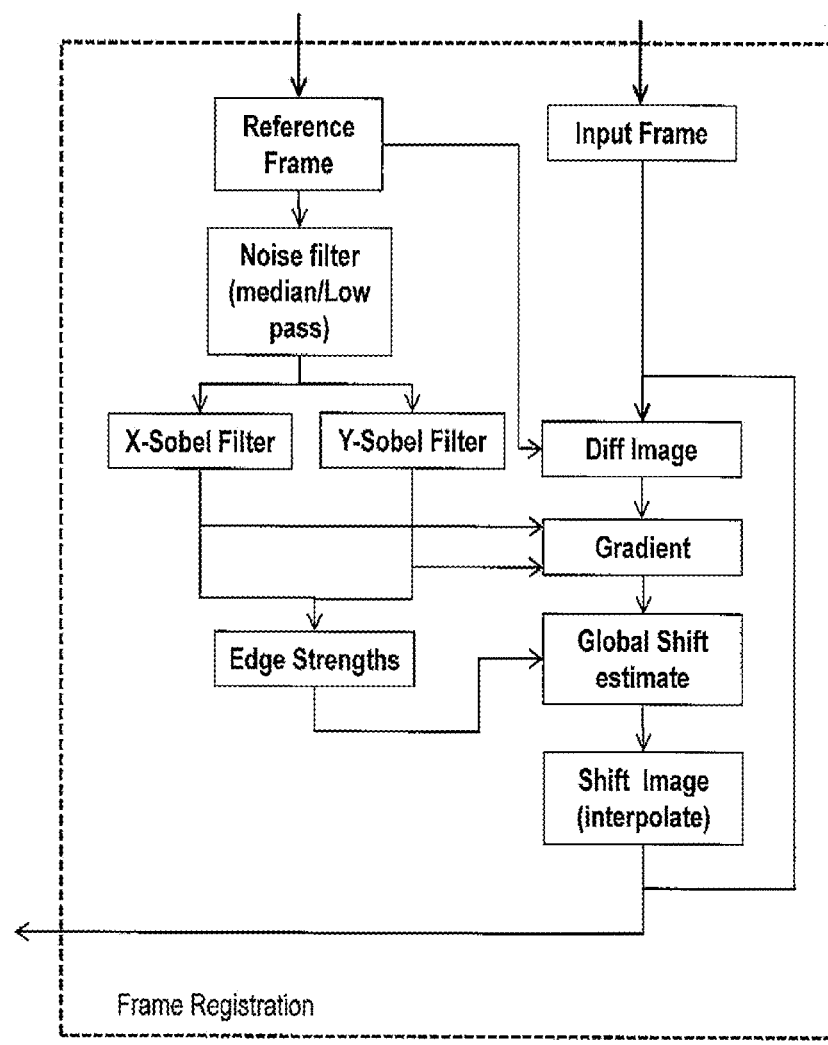
FIG. 3 is an exemplary block diagram of a frame registration module, according to some embodiments of the disclosed invention.

FIG. 3 is an exemplary block diagram of a frame registration engine, according to some embodiments of the disclosed invention. In some embodiments, the disclosed invention utilizes independent frame registration engines, for example, one large engine in the middle of the FOV for global measurement and registration, and several (e.g., 18) smaller engines distributed over the FOV with overlaps to more accurately measure shifts in harsh turbulent scene conditions to less than ⅛ of a pixel. In some embodiments, the frame registration engines use rule based decisions for adaptable processing of dynamic scenes and operating conditions, for example, target tracking, split screening, etc.

Referring back to FIG. 3, as shown, the frame registration engines (e.g., the frame registration engine 202 of FIG. 2) take two inputs: a reference frame (the last frame), and an input frame, which is the second to last frame, or last preceding frame. Both the reference frame and input frame may be luminance frames. The reference frame is processed by a noise-filtering module which may include a median filter (e.g., a 3×3 median filter) and/or a low-pass filter (e.g., a low-pass filter, such as a Gaussian filter). The output of the noise-filtering module may optionally be further processed by two parallel Sobel filters, each of which performs an approximation of the gradient of the image intensity function, one in the X direction (a horizontal gradient filter) and one in the Y direction (a vertical gradient filter). The outputs of the X-Sobel filter (or horizontal Sobel filter) and the Y-Sobel filter (or vertical Sobel filter) are arrays of the same size or approximately the same size as the reference frame, and are referred to as gx (or an X-derivative frame) and gy (or a Y-derivative frame) respectively.

A 2×2 matrix of edge strengths is then calculated as EdgeStrengths=[sum($gx^2$), sum(gx*gy); sum(gx*gy), sum($gy^2$)], where gx*gy denotes an element-wise product, the semicolon is a delimiter between the first and second rows of the matrix, and the sum function sums over all elements of the argument of the function, the arguments in the expression for EdgeStrengths each being a 2-dimensional array. A gradient is then calculated in a gradient module. The gradient is the vector Grad=[sum(gx*Diff), sum(gy*Diff)], where Diff is the difference between the reference frame and the input frame, calculated in a difference module ("Diff Image" in FIG. 4). A global shift estimate module then calculates an estimate of the shift required to register the input frame to the reference frame. This estimate is calculated as inv(EdgeStrengths)*Grad, where inv(EdgeStrengths) is the inverse of the 2×2 EdgeStrengths matrix, and the product is a matrix product. The input image is then shifted, and the process is repeated. In some embodiments, the image is shifted using a bicubic spline to interpolate between pixels, making shifts of a fraction of a pixel possible.

The calculation and application of the estimated shift required to register the frames may be repeated, in a loop, for a fixed number of times or until the estimated shift required is less than a lower threshold selected to test for adequate registration.

In some embodiments, the loop is repeated ten times, and the global shift estimate at the end of the final iteration is used to determine whether the frame registration succeeded. For example, a global shift estimate that is less than +/−½ pixel in the X direction and less than +/−½ pixel in the Y direction may be considered an indication that frame registration succeeded; a global shift estimate that is larger in either direction may be considered an indication that frame registration failed. If the frame registration has succeeded, then all K−I of the preceding frames are shifted according to the final global shift estimate, and the set of K frames, thus registered to each other, is sent to the turbulence correction module for further processing. When the K−I frames are shifted, K−2 of them are frames that may have already been shifted, e.g., before the current frame was received. As a result, the shift in previous frames may accumulate as new frames are received.

The K frames are also saved in the frame memory so that when the next new frame is received, the set of frames that will then form the K−I previously received frame will already be registered to each other. In some embodiments, only luminance frames are used to determine the shift required to register the input frame to the reference frame (i.e., chrominance frames are not used for this purpose). Once determined, the shift is applied to shift the K−I previously received luminance frames to register them to the last luminance frame, and the same shift is applied to shift the K−I previously received chrominance frames to register them to the last chrominance frame. Under some circumstances, e.g., if the turret 115 is causing the video camera 110 to pan rapidly, frame registration may fail. In these cases, the preceding frames are purged or marked as unusable, and the process starts again when another frame is received.

Table 1 below shows an example for K=6 corresponding to the receipt of a sequence of ten frames. In this example, frame registration fails at the receipt of frame N+2, so that only one frame is output from the frame registration engine at this step. It succeeds, or "passes", at the next step, upon receipt of frame N+3, so that two frames are output from the frame registration engine at this step, and then fails again at frame N+4, so that, again, only one frame is output from the frame registration engine at this step. It then succeeds for each of the remaining steps of the sequence, with a larger number of frames being output from the frame registration engine at each step, until the maximum number of six frames is again being processed.

TABLE 1

| | Frame Number | | | | | | | | | | |
|---|---|---|---|---|---|---|---|---|---|---|---|
| | N | N + 1 | N + 2 | N + 3 | N + 4 | N + 5 | N + 6 | N + 7 | N + 8 | N + 9 | N + 10 |
| Processed Frames | 6 | 6 | 1 | 2 | 1 | 2 | 3 | 4 | 5 | 6 | 6 |
| Registration Passed | Y | Y | N | Y | N | Y | Y | Y | Y | Y | Y |

As mentioned above, if frame registration has not failed during the previous K frames, then a set of K frames is sent to a turbulence correction processor (e.g., turbulence correction processor 212 in FIG. 2).

In some embodiments, the turbulence correction processor implements a numerical solution of a Sobolev-Laplace partial differential equation, which includes a time-reversed diffusion equation and a Laplace filter. The solution is generated numerically in the frequency domain. Each of the K frames received from the frame registration engine is transformed by Fourier transform (e.g., by fast Fourier transform, or "FFT") into the spatial frequency domain to form one of K Fourier transform frames. the K Fourier transform frames are then iteratively adjusted, where each iteration produces a better approximation to the solution of the partial differential equation.

Following are some non-limiting examples of the rules for frame registration (priority is top to bottom). The "value" is the measured frame to frame motion and "max" is a set limit to how much motion is to be compensated. This might be better to put below the next several paragraphs. This is the last step after frame registration is done.

Rule 1—If global tile registration is invalid (does not converge or value >max) go to global bypass.

Rule 2: If tile 8 and tile 9 registration results are invalid go to global bypass.

Rule 3a: If any of the subset tiles 0 thru 17 registration results are invalid replace result with the global tile result.

Rule 3b: If the absolute value of the difference between subset tile 0 thru 17 and the global tile is >1 pixel/line, replace the corresponding tile result with global tile result.

Figure 4:
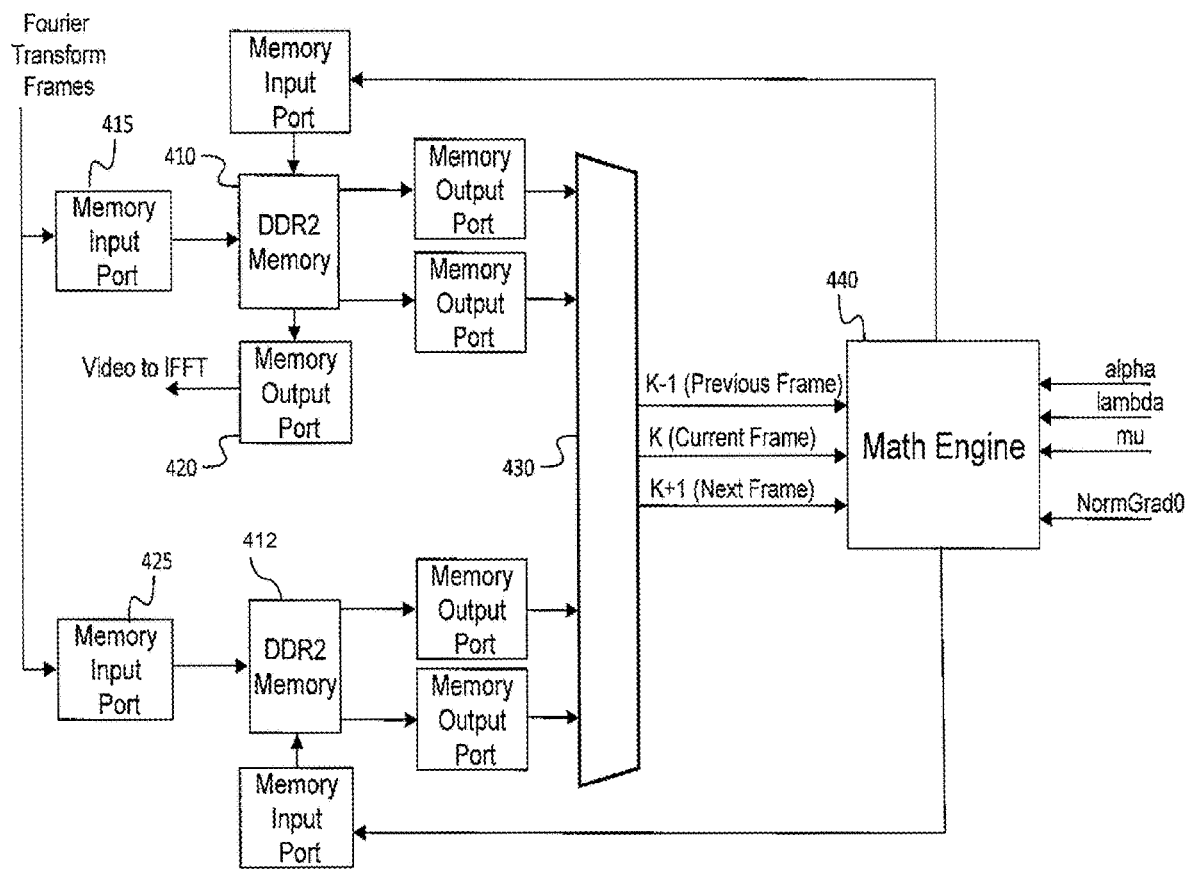
FIG. 4 is an exemplary block diagram for a turbulence correction processor, according to some embodiments of the disclosed invention.

FIG. 4 is an exemplary block diagram for a turbulence correction processor, according to some embodiments of the disclosed invention. As depicted, Fourier transform frames are fed alternately into two double data rate synchronous dynamic random-access memories 410 and 412, via respective memory input ports 415 and 425. For instance, if K=6 (i.e., six frames contribute to each output of the turbulence correction module), then Fourier transform frames 1, 3, and 5 may be in the first DDR2 memory 410 and Fourier transform frames 2, 4, and 6 may be in the second DDR2 memory 420. A multiplexer 430 transfers two or three frames at a time into the math engine 440, which executes operations corresponding to the calculations of Listing 1, as well as the methods described by FIGS. 3 and 6.

Two frames, for example, are transferred when calculating an updated value for an "end frame" (the first or $K^{th}$ Fourier transform frame), and three Fourier transform frames are transferred when calculating an updated value for any of the other ("intermediate") Fourier transform frames. The math engine 440 takes as input the parameters alpha, lambda and mu, and an initial value of the quantity NormGrad for each Fourier transform frame (referred to as NormGrad0 in FIG. 4, and as grad0 in Listing 1). To average all of the Fourier transform frames prior to taking the IFFT, the math engine sums the Fourier transform frames in the first DDR2 memory 410 to form a first sum, and sums the Fourier transform frames in the second DDR2 memory 420 to form a second sum, then sums the first sum and the second sum and divides by the number of Fourier transform frames (e.g., 6 in the above example).

Figure 5B:
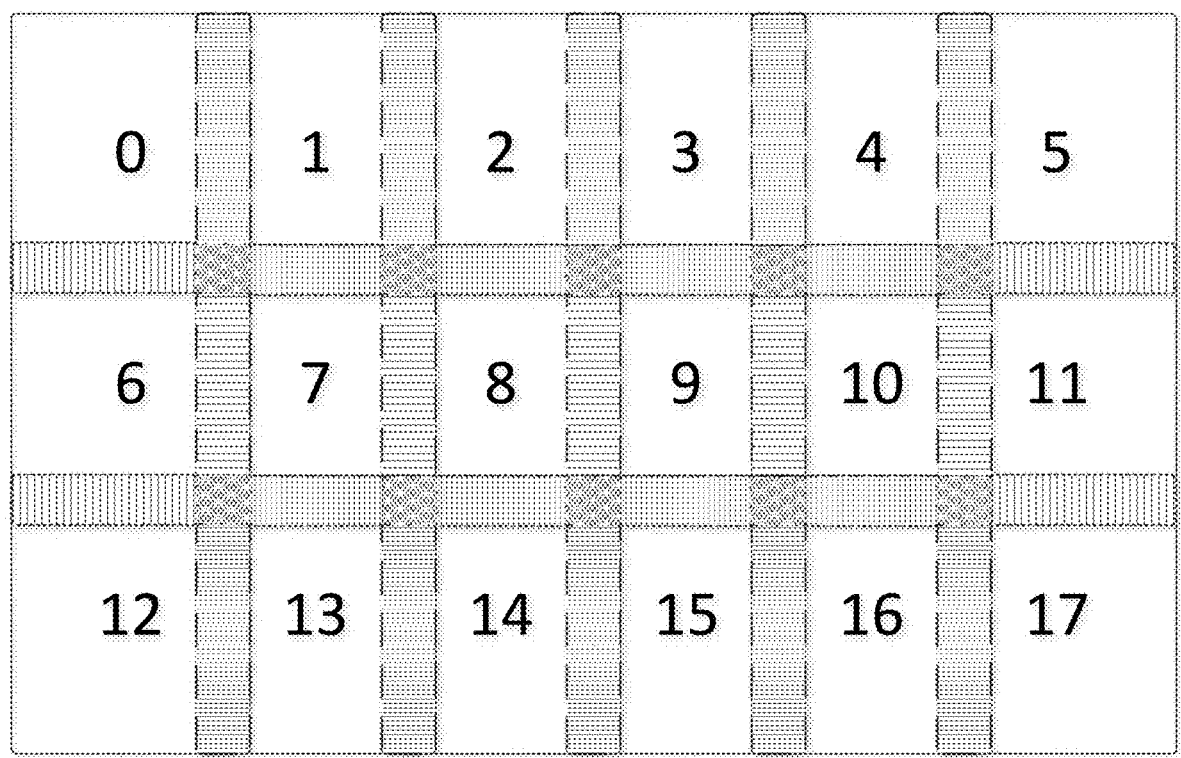

FIGS. 5A and 5B illustrate exemplary frame registration grids, according to some embodiments of the disclosed invention. The tile grid depicted in FIG. 5A is for an example of 1280×720 image with 18 tiles, where each tile size is 256×256, the larger global tile window is 384×384 m and the registration size is 192×192. As shown, a global tile 502 shown by the dotted lines, is the first and primary motion estimation. This tile larger than the registration tiles so that it is less affected by intra-frame motion. The global tile 502 also provides a reference to be compared to the registration tiles. Since the registration tiles are smaller, they can move asymmetrically based on scene content. Some differences to the global tile is expected from the turbulence but too much is considered an error and is corrected in the frame registration rules.

Bold outlines in FIG. 5A illustrate tile boundaries (256× 256 in this example). The shaded areas depict the overlap areas from tile to tile. The dashed lines depict the frame registration window within a tile. The dotted line shows the global registration tile within the 1280×720 image. In this example, the global tile is centered in the image and doesn't move, however, in some embodiments, it can move based on changing regions of interest in the video stream, for example, new targets or features within the video. The blank areas shown in FIG. 5B are the non-overlapping region, horizontal hash marks are the horizontal overlapping region, vertical hash marks are the vertical overlapping region, and the diamond pattern is the vertical and overlapping region.

Figure 6:
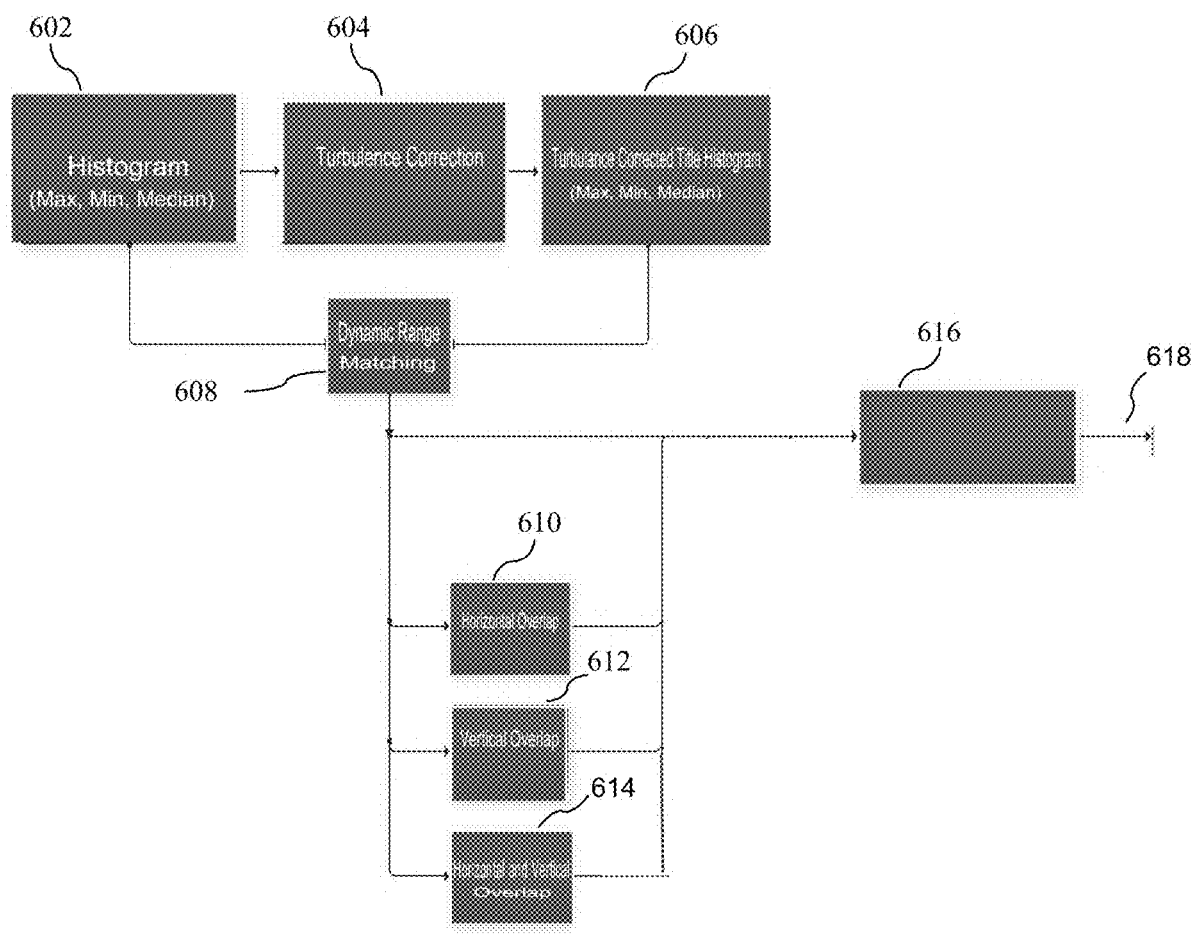
FIG. 6 is an exemplary block diagram illustrating a method of dynamic matching and tile mosaicing, according to some embodiments of the disclosed invention.

FIG. 6 is an exemplary block diagram illustrating a method of dynamic matching and tile mosaicing, according to some embodiments of the disclosed invention. As depicted in block 602, a histogram of the image input tile is created from individual video tiles, for example, by a video processor or image processor similar to the video processor 130 in FIG. 1. From the histogram, the image processor calculates a set of image statistics such as, max, min, and median of the pixels of the image input tile. The video tile is then processed, for example, by the turbulence correction processor 212 in FIG. 2 to correct the turbulence, in block 604. This post processed image tile is measured and a second histogram is created from this image tile, for example, by the turbulence correction processor 212 in FIG. 2, in block 606. The post processed image tile is provided to dynamic range matching in block 608 in addition to the input tile statistics (from block 602) and post processed tile statistics (from block 606). Block 602 is a pass through for the input image tile and the creation of the input image tile histogram. The input image tile statistics are supplied to block 608. Block 606 is a pass through for turbulence corrected image tiles and the creation of the post turbulence correction tile histogram. Turbulence corrected image and histogram statistics of the input image tile and the turbulence corrected image tile are then provided to block 608. A linear relationship between the input tile statistics and post processed tile statistics is then formed in block 608.

A gain term is also calculated in block 608 based on the maximum to minimum ratio of the input tile to the post processed tile. In addition, a level offset for level shifting is calculated in block 608, based on the difference in the medians of the input tile and the post processed tile. The post processed tile is multiplied by the gain term and shifted by adding the level offset previously calculated. In some embodiments, the above-mentioned processes are performed by a video processor or image processor similar to the video processor 130 in FIG. 1.

The final mosaiced image is a combination of all subsequent tiles that have been processed through the turbulence correction algorithm and dynamic range matching. Each tile overlaps other tiles in multiple spatial areas. In block 610, horizontal overlap is calculated by weighting each tile's overlap based on its position relative to the start of overlap, based on Equation (1), for example, by a video processor or image processor similar to the video processor 130 in FIG. 1. For example, as the position moves spatially to the right, the weighting of the left tiles' pixels are being less and less and subsequently the right tiles' pixels will have more and more weighting.

$$P_{HO}(x) = P_{LT}(x)\frac{Ho - x}{Ho} + P_{RT}(x)\frac{x}{Ho} \quad (1)$$

where, function $P_{HO}(x)$ is the pixel value of the horizontal overlap, $P_{LT}(x)$ is the x pixel value of the left tile in the overlap region, $P_{RT}(x)$ is the x pixel value of the right tile in the overlap region, Ho is the total number of horizontal overlapping pixels in a line, and X is the horizontal position in each line in the overlapping region.

Vertical overlap is determined in block 612 and is applied to the vertical overlap area between tiles spaced vertically. Vertical overlap image is calculated by weighting the contributing tiles' pixels based on their relative position of the start of the overlap. As the positions move vertically downward, the upper tile's pixels are weighted less and less and the lower tile's pixels are weighted more and more, as shown by Equation (2), for example, by a video processor or image processor similar to the video processor 130 in FIG. 1.

$$P_{VO}(y) = P_{TT}\frac{Vo - y}{Vo} + P_{BT}\frac{y}{Vo} \quad (2)$$

where, Function $P_{VO}(y)$ is the pixel value of the vertical overlap, $P_{TT}(y)$ is the y pixel value of the top tile in the overlap region, $P_{BT}(y)$ is the y pixel value of the bottom tile in the overlap region, Vo is the total number of vertical overlapping pixels in a column, and Y is the vertical position in each column of the overlapping region.

Areas in which there are horizontal and vertical overlaps (for example, the area with the diamond pattern depicted in FIG. 5B) require a slightly different approach. In some embodiments, there are four contributing tiles for these areas. As one moves from the top left to the bottom right of the overlapping region pixels from the left and top are weighted less and less, but pixels from the bottom right are weighted more and more, in block 614 as illustrated by Equation (3), for example, by a video processor or image processor similar to the video processor 130 in FIG. 1. As one moves left to right, the left tile's pixels are weighted relatively less and less and the right tile's pixels weighted relatively more and more. As one moves from downwards vertically the upper tile's pixels are weighted less and less and lower tile's pixels are weighted more and more.

$$P_{HVO}(x, y) = \frac{1}{4}\left(\left((P_{TLT}(x, y) + P_{BLT}(x, y)) * \frac{Ho - x}{Ho}\right) + \left((P_{TRT}(x, y) + P_{BRT}(x, y)) * \frac{x}{Ho}\right)\right) + \left((P_{TLT}(x, y) + P_{TRT}(x, y)) * \frac{Vo - y}{Vo}\right) + \left((P_{BLT}(x, y) + P_{BRT}(x, y)) * \frac{y}{Vo}\right)\right) \quad (3)$$

where, function $P_{HVO}(x,y)$ is the pixel value of the horizontal and vertical overlap region, $P_{TLT}(x,y)$ is the pixel value of the top left tile in the overlap region, $P_{TRT}(x,y)$ is the pixel value of the top right tile in the overlap region, $P_{BLT}(x,y)$ is the pixel value of the bottom left tile in the overlap region, and $P_{BRT}(x,y)$ is the pixel value of the bottom right tile in the overlap region.

Block 616 shows a memory storage for the full field of view turbulence corrected image. The outputs of block 608 non-overlapping regions, block 610 horizontal overlapping regions, block 612 vertical overlapping regions and block 614 for combined horizontal and vertical overlapping regions are stored in block 616, in their respective positions as a full field of view turbulence corrected image.

In some embodiments, the spatial/frequency domain processing proceeds (for example, by the turbulence correction processor 212 in FIG. 2) according to the following equation, in which k is a frame index, and n is an iteration index:

$$\hat{u}_k^{n+1} - \hat{u}_k^n = c_k^n \frac{-4D(m_1, m_2)}{1 + 4\lambda D(m_1, m_2)} + \hat{u}_k^n + \mu(\hat{u}_{k+1}^n + \hat{u}_{k-1}^n - 2\hat{u}_k^{n+1}) \quad (4)$$

This equation approximates the Sobolev-Laplace partial differential equation. The $\hat{u}_k^n$ is the $k^{th}$ quantity Fourier transform frame at the $n^{th}$ iteration of the iterative solution. The above Equation (4) has, on the right hand side, a first term corresponding to a diffusion equation, and a second term corresponding to a Laplace filter. The ratio denotes an element-wise ratio of matrices $$\frac{4D(m_1, m_1)}{1 + 4\lambda D(m_1, m_1)}$$

(with 1 being an identity matrix of the same size as D), and the matrix $D(m_1, m_1)$ is defined as:

$$D(m_1, m_2) = \left[\sin\left(\frac{m_2\pi}{M_1}\right)^2 + \sin\left(\frac{m_2\pi}{M_2}\right)^2\right]^p \quad (5)$$

where p is a parameter that, when selected to be greater than 1, increases the magnitude of the middle spatial frequencies. The value p may be between 1.1 and 2.0, and in one embodiment it is 1.3. In some embodiments, the value of p may be less than 1, e.g., it may be between 0.5 and 0.9. In some embodiments, the value of p may be between 0.5 and 2.0. The product is an element-wise product of the matrices.

The quantity is defined as:
The product $$\frac{-4D(m_1, m_2)}{1 + 4\lambda D(m_1, m_2)}\hat{u}_k^n$$

is an element-wise product of the $$\frac{-4D(m_1, m_2)}{1 + 4\lambda D(m_1, m_2)}$$

and $\hat{u}_k^u$. The quantity $c_k^n$ is defined as:

$$c_k^n = \frac{\sum_{m_1, m_2} D(m_1, m_2)|\hat{u}_k^n(m_1, m_2)|^2}{\sum_{m_1, m_2} D(m_1, m_2)|\hat{u}_k^0(m_1, m_2)|^2} - \alpha \quad (6)$$

where a is a parameter that may be adjusted to change the amount of image sharpening performed by the turbulence correction module; in some embodiments, a is about 5.

Equation (4) may be rewritten as $$\hat{u}_k^{n+1} = \frac{1}{1 + 2\mu}\left[\hat{u}_k^n\left(1 - c_k^n \frac{4D(m_1, m_1)}{1 + 4\lambda D(m_1, m_1)}\right) + \mu(\hat{u}_{k+1}^n + \hat{u}_{k-1}^n)\right] \quad (7)$$

which gives the $k^{th}$ Fourier transform frame at the $(n+I)^{th}$ iteration as a function of Fourier transform frames at the previous iteration.

Listing 1 below shows an example of Matlab™ code corresponding to the operations of a turbulence correction module in the spatial frequency domain.

Listing 1
1. for it=I:maxIter
2. % update chi
3. chi{I}=normG rad(I)/gradO(I)-alpha;
4. % update end member
5. uhat(:,:,1)=(uhat(:,:,1).*(1−chi(1)*Dkern)+mu*(uhat(:,:,2)))./(1+mu);
6. % update interior members
7. for k=2: K-I
8. chi(k)=normGrad(k)/gradO(k)−alpha;
9. uhat(:,:,k)=(uhat(:,:,k).*(1−chi(k)*Dkern)+mu*(uhat(:,:,k+1)+uhat(:,:,k−1)))./(1+2*mu);
10. end
11. % update end member
12. chi(K)=normGrad(K)/gradO(K)−alpha;
13. uhat(:,:,end)=(uhat(:,:,end).*(1−chi(k)*Dkern)+mu*(uhat(:,:,end−1)))./(1+mu);
14. % update normalized gradient
15. for k=1:K
16. normGrad(k)=abs{sum(sum{D.*squeeze(conKuhat(:^k)).*uhat(:,:,k))))));
17. end
18. end In Listing 1, line 8 implements Equation (6), and line 9 implements Equation (7). Modified expressions are used (at lines 3 and 5, and at lines 12 and 13) for the first and $K^{th}$ frames, for which there is no $(k-1)^{th}$ or $(k+1)^{th}$ frame available, respectively. The quantity normGrad(k) is the numerator of the first term of Equation (6); it is updated at the end of each iteration, at lines 15-17 of Listing 1. The quantity Dkera of Listing 1 is the parameter λ affects the rate of convergence of the iterative solution, but will cause overshoot if selected to be too large. In some embodiments, λ is about 5. The quantity μ (mu in Listing 1) affects the balance between the relative degree to which spatial domain corrections and temporal domain corrections contribute to the adjustments applied by the turbulence correction module; in one embodiment, μ=1.

In some embodiments, the number of iterations (e.g., maxIter on line 1 of Listing 1) is set to a value, e.g., 6, that allows the video processor 130 to complete the turbulence correction process in the time interval between consecutive frames of video (e.g., in $\frac{1}{30}^{th}$ of a second for 30 Hz video).

Once an acceptable solution has been generated in the spatial frequency domain, the resulting K frames are averaged together and an inverse FFT (IFFT) is used to transform the average frame back into the image domain, forming an enhanced frame. If the input frames are luminance frames, then the output frames are enhanced luminance frames. This way, the invention removes turbulence degradation across the entire FOV to improve image resolution and contrast.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. A method for image turbulence correction, the method comprising:
   receiving a plurality of consecutive image frames comprising a previous image frame, a current image frame and a plurality of preceding image frames, from a video camera;
   demosaicing the previous image frame, current image frame and the plurality of preceding image frames into a plurality of same size overlapping video tiles;
   determining a displacement of each of the video tiles of the current frame relative to respective video tiles of the previous frame and the plurality of preceding image frames to spatially align the video tiles of the current image frame with video tile of the previous image frame and the plurality of preceding image frames;
   converting the video tiles of the current image frame, the previous image frame, and the plurality of preceding image frames into a frequency domain;
   iteratively processing the video tiles of the previous image frame, the current image frame and the plurality of preceding image frames for turbulence correction in the frequency domain;
   converting the turbulence corrected video tiles into a spatial domain, wherein the converted turbulence corrected video tiles form a single video frame tile including turbulence degradation correction; and
   mosaicing the single video frame tiles including turbulence degradation correction together to generate a full field of view (FOV) turbulence correct video stream.

2. The method of claim 1, further comprising normalizing the turbulence corrected single video frame tile by utilizing a linear relationship between a range of pixels in a first set of image statistics and a range of pixels in a second set of image statistics, as a gain term and an offset.

3. The method of claim 2, wherein the first set of image statistics is a range of pixels from minimum to maximum in the current image frame and the second set of image statistics is a range of pixels from minimum to maximum in the turbulence corrected single video frame.

4. The method of claim 2, wherein the first set of image statistics is measured from a first histogram and the second set of image statistics is measured from a second histogram.

5. The method of claim 1, wherein said mosaicing the single video frame tiles comprises cropping of individual tiles and performing a weighted average calculation three overlapping horizontal, vertical, and both-horizontal-and-vertical regions.

6. The method of claim 5, wherein said weighted average calculation is based on a start of each of the overlapping regions.

7. The method of claim 1, further comprising displaying the FOV turbulence correct video stream on a display device.

8. A system for image turbulence correction comprising:
   a video camera for generating a plurality of consecutive image frames comprising a previous image frame, a current image frame and a plurality of preceding image frames;
   an image processor; and
   a video display, wherein
   the image processor includes computer code stored in a memory to perform the following processes when executed by the image processor:
   receives the plurality of consecutive image frames;
   demosaices the current image frame into a plurality of same size overlapping video tiles;
   determines a displacement of each of the video tiles of the current frame relative to respective video tiles of the previous frame to spatially align the video tiles of the current frame with video tile of the previous frame;
   converts the video tiles into a frequency domain;
   iteratively processes the video tiles of the previous image frame, the current image frame and the plurality of preceding image frames for turbulence correction in the frequency domain;
   converts turbulence corrected video tiles into a spatial domain, wherein the converted turbulence corrected video tiles is a single video frame tile including turbulence degradation correction;
   mosaics the single video frame tiles of the previous image frame, the current image frame and the plurality of preceding image frames together to generate a full field of view (FOV) turbulence correct video stream; and
   displays the FOV turbulence correct video stream on the video display.

9. The system of claim 8, wherein the image processor further normalizes the turbulence corrected single video frame tile by utilizing a linear relationship between a range of pixels in a first set of image statistics and a range of pixels in a second set of image statistics, as a gain term and an offset.

10. The system of claim 9, wherein the first set of image statistics is a range of pixels from minimum to maximum in the current image frame and the second set of image statistics is a range of pixels from minimum to maximum in the turbulence corrected single video frame.

11. The system of claim 9, wherein the first set of image statistics is measured from a first histogram and the second set of image statistics is measured from a second histogram.

12. The system of claim 8, wherein the image processor mosaices the single video frame tiles by cropping individual tiles and performing a weighted average calculation on three overlapping horizontal, vertical, and both-horizontal-and-vertical regions.

13. The system of claim 12, wherein said weighted average calculation is based on a start of each of the overlapping regions.

14. A system for image turbulence correction comprising:
means for receives the plurality of consecutive image frames comprising a previous image frame, a current image frame and a plurality of preceding image frames;
means for demosaicing the current image frame into a plurality of same size overlapping video tiles;
means for determining a displacement of each of the video tiles of the current frame relative to respective video tiles of the previous frame to spatially align the video tiles of the current frame with video tile of the previous frame;
means for converting the video tiles into a frequency domain;
means for iteratively processing the video tiles of the previous image frame, the current image frame and the plurality of preceding image frames for turbulence correction in the frequency domain;
means for converting turbulence corrected video tiles into a spatial domain, wherein the converted turbulence corrected video tiles is a single video frame tile including turbulence degradation correction;
means for mosaicing the single video frame tiles of the previous image frame, the current image frame and the plurality of preceding image frames together to generate a full field of view (FOV) turbulence correct video stream; and
means for displaying the FOV turbulence correct video stream on the video display.

15. The system of claim 8, further comprising means for normalizing the turbulence corrected single video frame tile by utilizing a linear relationship between a range of pixels in a first set of image statistics and a range of pixels in a second set of image statistics, as a gain term and an offset.

16. The system of claim 15, wherein the first set of image statistics is a range of pixels from minimum to maximum in the current image frame and the second set of image statistics is a range of pixels from minimum to maximum in the turbulence corrected single video frame.

17. The system of claim 16, wherein the first set of image statistics is measured from a first histogram and the second set of image statistics is measured from a second histogram.

18. The system of claim 14, wherein said means for mosaicing the single video frame tiles comprises means for cropping of individual tiles and performing a weighted average calculation three overlapping horizontal, vertical, and both-horizontal-and-vertical regions by the image processor.

19. The system of claim 18, wherein said weighted average calculation is based on a start of each of the overlapping regions.

* * * * *